United States Patent [19]

Kustka

[11] 4,105,863

[45] Aug. 8, 1978

[54] ARRANGEMENT FOR COMBINING DATA SYMBOLS IN ACCORDANCE WITH A PREDETERMINED WEIGHTING FUNCTION

[75] Inventor: George John Kustka, Matawan, N.J.

[73] Assignee: Bell Telephone Laboratories, Incorporated, Murray Hill, N.J.

[21] Appl. No.: 752,066

[22] Filed: Dec. 20, 1976

[51] Int. Cl.² ................................................ H04L 27/24
[52] U.S. Cl. .......................................... 178/67; 325/42; 325/45; 179/15 A
[58] Field of Search ................. 325/163, 42, 43, 44, 325/156, 157, 45; 178/324, 66 R, 67, 68; 333/18; 179/15 A, 15 BC

[56] References Cited

U.S. PATENT DOCUMENTS

| | | | |
|---|---|---|---|
| 2,982,852 | 5/1961 | Fano | 325/44 |
| 3,128,342 | 4/1964 | Baker | 178/66 |
| 3,225,142 | 12/1965 | Schroeder | 325/44 |
| 3,502,986 | 3/1970 | Lucky | 325/44 |
| 3,921,072 | 11/1975 | Sato | 333/18 |
| 3,959,637 | 5/1976 | Nussbaumer | 333/18 |
| 3,990,022 | 11/1976 | Van Gerwen | 325/42 |
| 4,016,410 | 4/1977 | Eggermont | 333/18 |
| 4,027,258 | 5/1977 | Perreault | 333/18 |

Primary Examiner—Robert L. Griffin
Assistant Examiner—Michael A. Masinick
Attorney, Agent, or Firm—Roy C. Lipton

[57] ABSTRACT

To minimize distortion, a sequence of phase modulated signal elements (data symbols) are combined in accordance with a predetermined shaping (weighting) function by a transversal filter augmented with a baud rate control circuit. The transversal filter includes a plurality of multipliers, located at taps along a delay line, forming products between data symbols and coefficients representing segments of the predetermined weighting function. The baud rate control circuit shifts the phase of the delayed data symbols and delivers these "extended" data symbols to certain multipliers. By digitally processing segments of the weighting function and portions of an overall data symbol this invention yields to compact construction.

10 Claims, 7 Drawing Figures

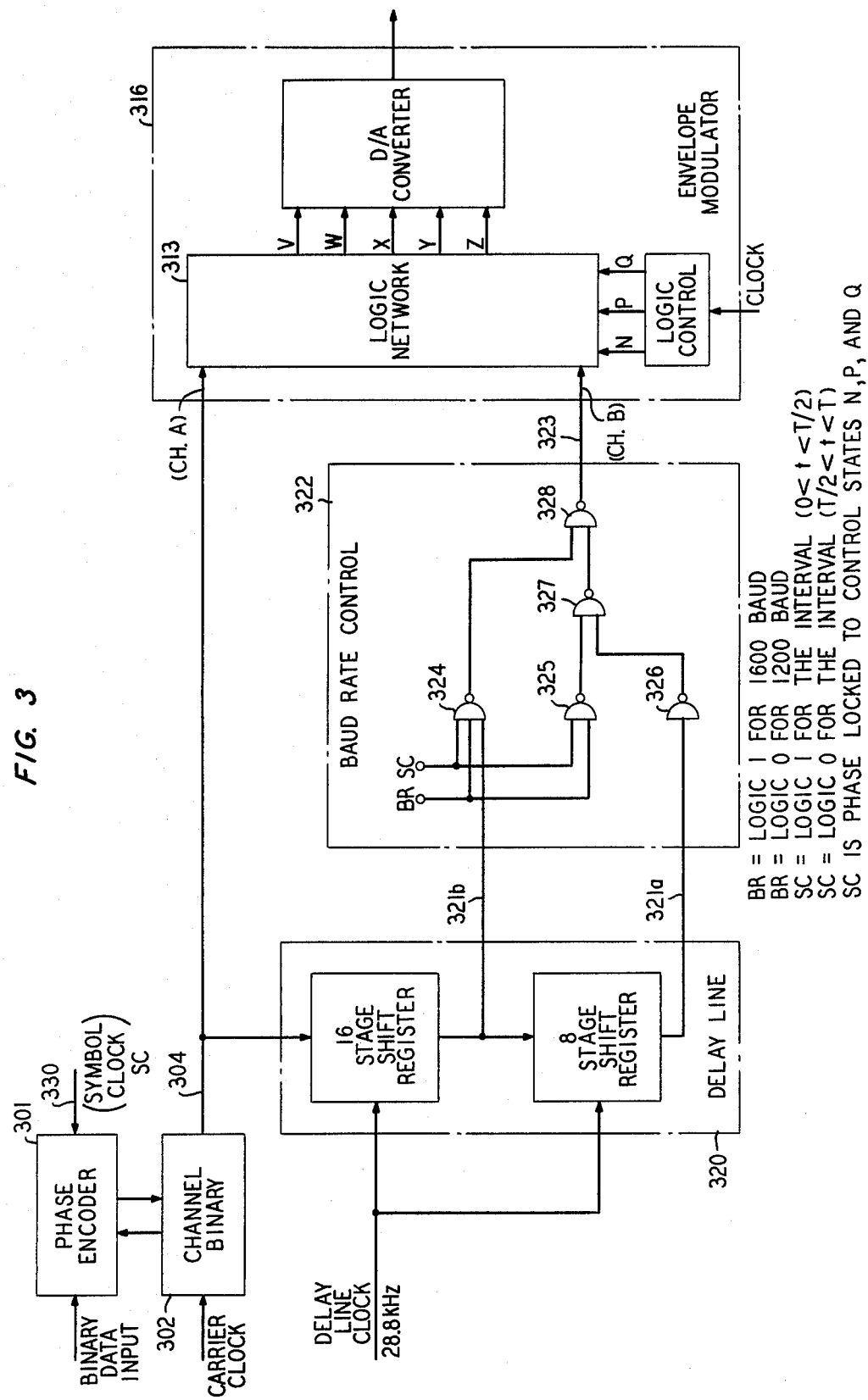

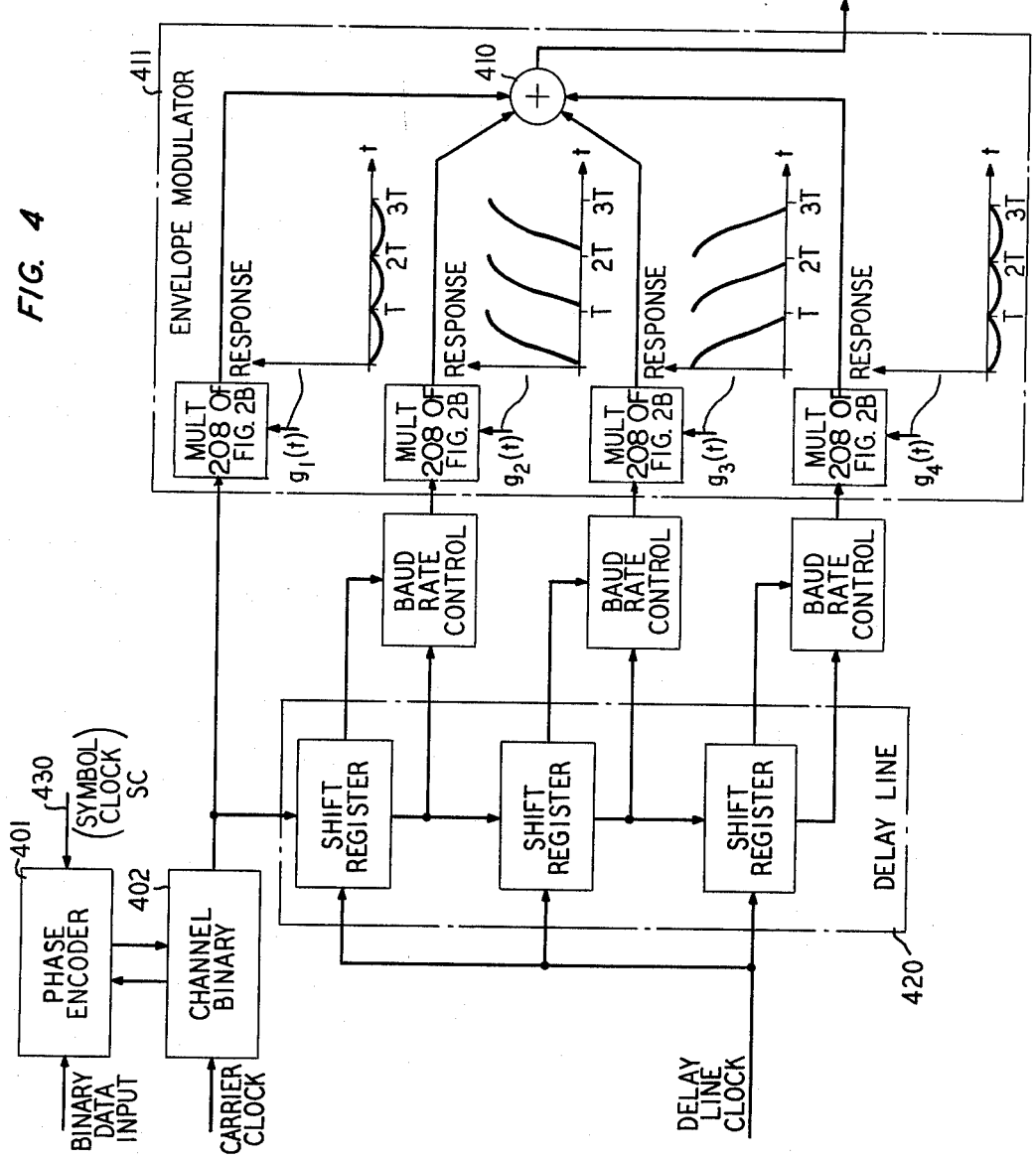

ARRANGEMENT FOR COMBINING DATA SYMBOLS IN ACCORDANCE WITH A PREDETERMINED WEIGHTING FUNCTION

FIELD OF THE INVENTION

This invention relates to pulse modulation transmission systems and more specifically to arrangements for combining a sequence of data symbols in accordance with a predetermined weighting function.

DESCRIPTION OF THE PRIOR ART

In phase shift keyed (PSK) data transmission systems, the transmitted waveforms are abruptly modulated and the modulated signal generates a significant amount of out-of-band energy which may additionally result in spectral overlap. Such unwanted energy, both out of band and in band, impairs the overall transmission quality. This unwanted energy, often referred to as distortion, may be reduced in a number of ways. A known desirable way involves an actual shaping of the transition between adjacent modulated signal elements (data symbols). The unwanted energy in an abruptly modulated PSK signal is advantageously reduced when data symbols are combined in accordance with a predetermined shaping (weighting) function. The weighting function characterizes the insertion of data symbols onto an output signal path by specifying the percentage of full amplitude to be admitted as a function of time.

An arrangement to minimize the out-of-band energy caused by abrupt modulation is disclosed in U.S. Pat. No. 3,128,342 issued on Apr. 7, 1964 to P. A. Baker. In this patent alternate bit pairs (dibits) derived from a source of binary digits are applied to separate counting chains to provide two sources of PSK signals. Each dibit corresponds to a data symbol and is arranged to control the phase of one PSK signal source for an interval spanning two dibit (symbol) periods. These sources are weighted by envelope modulators, each of which multiplies a PSK signal source with a raised cosine wave. The products are then combined in a summing amplifier and thereafter filtered to remove out-of-band energy. The data symbols at the filter output are ready for transmission. However, two sources of data symbols plus associated control circuitry are required by Baker to reduce distortion by combining signals in accordance with a predetermined weighting function.

Another arrangement is shown in U.S. Pat. No. 3,749,843 issued on July 31, 1973 to Roycraft et al. This patent teaches the multiplication of a data symbol by a sequence of fixed amounts corresponding to a predetermined weighting function. The weighting function is embedded in the interconnection of combinatorial logic gates and is sequenced by successive states of a timing signal. Two sources of data symbols of the type taught in the Baker patent are used to impress data symbols onto an output signal path over an interval of two symbol periods. While the Roycraft patent streamlines the multiplication process, the requirement of the plurality of sources of data symbols and the associated control circuitry remains unchanged.

Both Baker and Roycraft imply that distortion may be further reduced by introducing data symbols to an output signal path over an interval greater than two symbol periods. However, each additional symbol period not only requires another source of data symbols but also requires that the duration of data symbols from each source be extended yet another symbol period. Each additional symbol period further requires a substantial increase in circuitry to implement an enlarged weighting function.

It is therefore an object of this invention to eliminate the need for a plurality of modulators or sources of data symbols.

It is another object of this invention to further reduce the distortion by allowing the introduction of data symbols to an output signal path over an interval greater than two symbol periods without requiring a substantial increase in circuitry.

SUMMARY OF THE INVENTION

In accordance with this invention the amplitude of data symbols are regulated in accordance with a segment of a predetermined weighting function and continuations in time of these original data symbols, referred to as extended data symbols, are regulated in accordance with another segment of the predetermined weighting function. By thus separately processing the original and extended portions of the overall data symbol, only one source of data symbols is required irrespective of the number of symbol periods over which the data symbol is introduced to an output signal path.

It is a feature of this invention that a transversal filter adapted to accept original data symbols, including multipliers located at taps along a delay line, is used in forming extended data symbols and in regulating the amplitude of original and extended data symbols.

In accordance with a specific embodiment of this invention, a single source of abruptly modulated PSK signals of T seconds duration is used to supply original data symbols. So that data symbols may be introduced to an output signal path over a duration of a plurality of symbol periods, means are provided for generating extended data symbols. An overall data symbol is formed from portions comprising an original data symbol and an extended data symbol. The predetermined weighting function is also divided into two segments, each having a duration equal to the duration of a corresponding portion of the overall data symbol and multiplied therewith. The products of the amplifiers are then added together.

The foregoing and other objects and features of this invention will be more fully understood from the following description of illustrative embodiments taken in conjunction with the accompanying drawings.

BRIEF DESCRIPTION OF THE DRAWINGS

FIG. 3 shows, in schematic form, an embodiment of the invention for operation at two specific baud rates;

FIG. 4 shows a block diagram of a combining arrangement in which data symbols are introduced over a four symbol interval to further reduce distortion in accordance with the invention; and FIG. 5 shows a weighting function including a precursor and tail, quantized for digital implementation and useful in the practice of this invention.

DETAILED DESCRIPTION

Figure 1A:
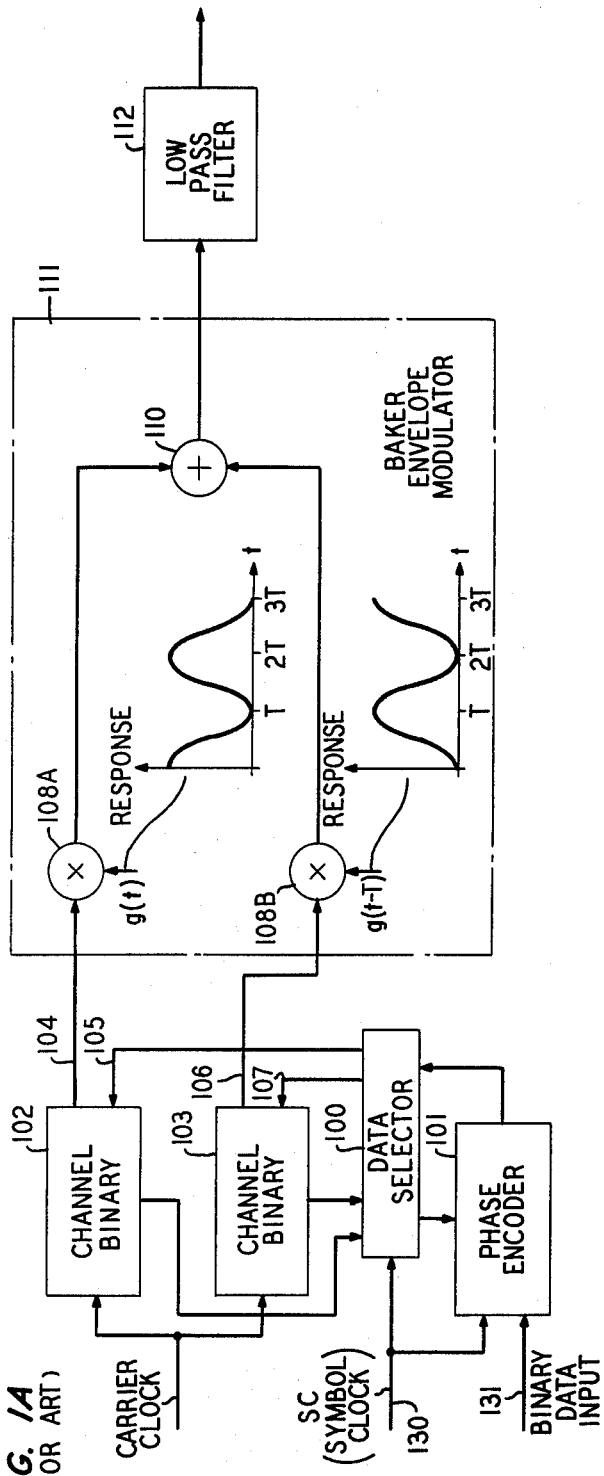
FIG. 1A is a simplified block diagram of the prior art including the aforementioned Baker patent.

A prior art method of smoothing phase transitions of an abruptly modulated four phase PSK signal as described in detail in the aforementioned Baker patent is functionally shown in FIG. 1A. Serial binary digits representing user data to be transmitted enter phase encoder 101 on input lead 131 at a rate of 2/T bits per second. Phase encoder 101 corresponds to the count logic and phase logic circuits of the Baker patent. The phase encoder forms dibit time periods of T seconds duration encompassing pairs of input bits and during each dibit period develops a signal designating a particular phase shift. In a differential PSK system, the state of a data symbol is its phase shift relative to a prior data symbol. In a differential PSK system such as the Baker patent, the phase designated by encoder 101 for the present data symol is jointly a function of the phase of the previous data symbol supplied by data selector 100 and a dibit supplied on binary data input 131. Data selector 100 corresponds to binary counter 23 and access gates 13 shown in FIG. 2 of the Baker patent. Data selector 100 delivers a designation of the phase of one channel binary (such as binary 102) to phase encoder 101 and delivers the phase designation of the data symbol from phase encoder 101 to the other channel binary (such as binary 103). The delivery of this phase information is synchronized by a symbol clock on lead 130 whose period corresponds to the dibit period of T seconds.

Channel binaries 102 and 103 corresponding to channels A and B of the Baker patent each generate a carrier wave of frequency $f_c$ fixed by the frequency of the carrier clock signal and the number of binary division cells within circuits 102 and 103. A phase shift is delivered to alternate channel binaries every symbol period. The phase designation delivered to channel binary 102, for example, is determined by observing the phase stored in binary 103 and calculating what it would be if it were shifted by an amount determined by an assigned phase shift associated with the dibit stored in phase encoder 101. In this example, four dibits are possible: 00, 01, 11, 10 and correspond to assigned phase shifts of 45°, 135°, 225° and 315°.

The carrier waves on lines 104 and 106, phase modulated in accordance with user data, enter multipliers 108A and 108B. Multiplier 108A forms a product between the carrier wave on line 104 and a weighting function $g(t)$ comprising a raised cosine waveform formed by dividing the symbol clock frequency by a factor of two, low pass filtering the resultant signal, and including a dc offset equal to the peak value of the filtered signal (as shown graphically in FIG. 1A). The product of the multiplication is a phase modulated carrier wave whose amplitude varies from zero to a maximum value and back to zero again over a time interval of 2T seconds or two data symbol intervals. Multiplier 108B performs the same operation between the carrier wave on line 106 and the weighting function $g(t-T)$ which is the same as weighting function $g(t)$, T seconds later. Signals out of he multipliers are then combined in summing amplifier 110 and shaped by low pass filter 112. As described in detail in the Baker patent an abruptly modulated differential PSK signal with low distortion is obtained.

Figure 1B:
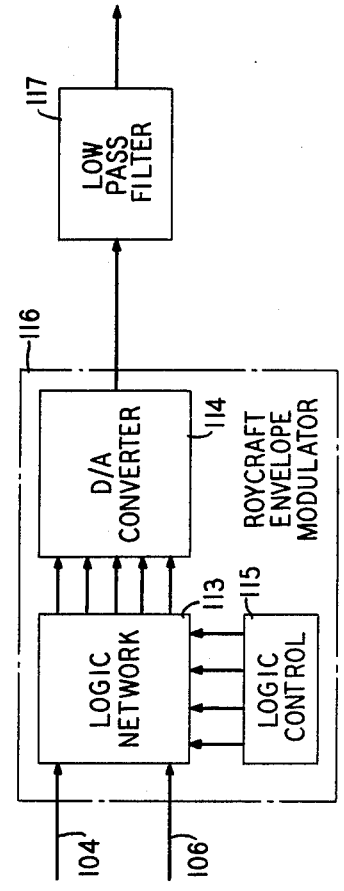
FIG. 1B is a simplified block diagram of the digital multiplier circuit taught in the Roycraft patent.

The same basic operation occurs in the Roycraft method shown in FIG. 1B except that the envelope modulation (multiplication) function is performed digitally. The weighting functions $g(t)$ and $g(t-T)$ are embedded in the interconnection of combinatorial logic gates in network 113. Multiplication is accomplished by introducing symbols to logic network 113 on input leads 104 and 106 and sequentially gating them through the logic network in accordance with successive stages of a timing signal supplied by logic control 115. The result of this multiplication is a parallel digital signal that is converted to analog form by digital to analog converter 114.

Figure 2A:
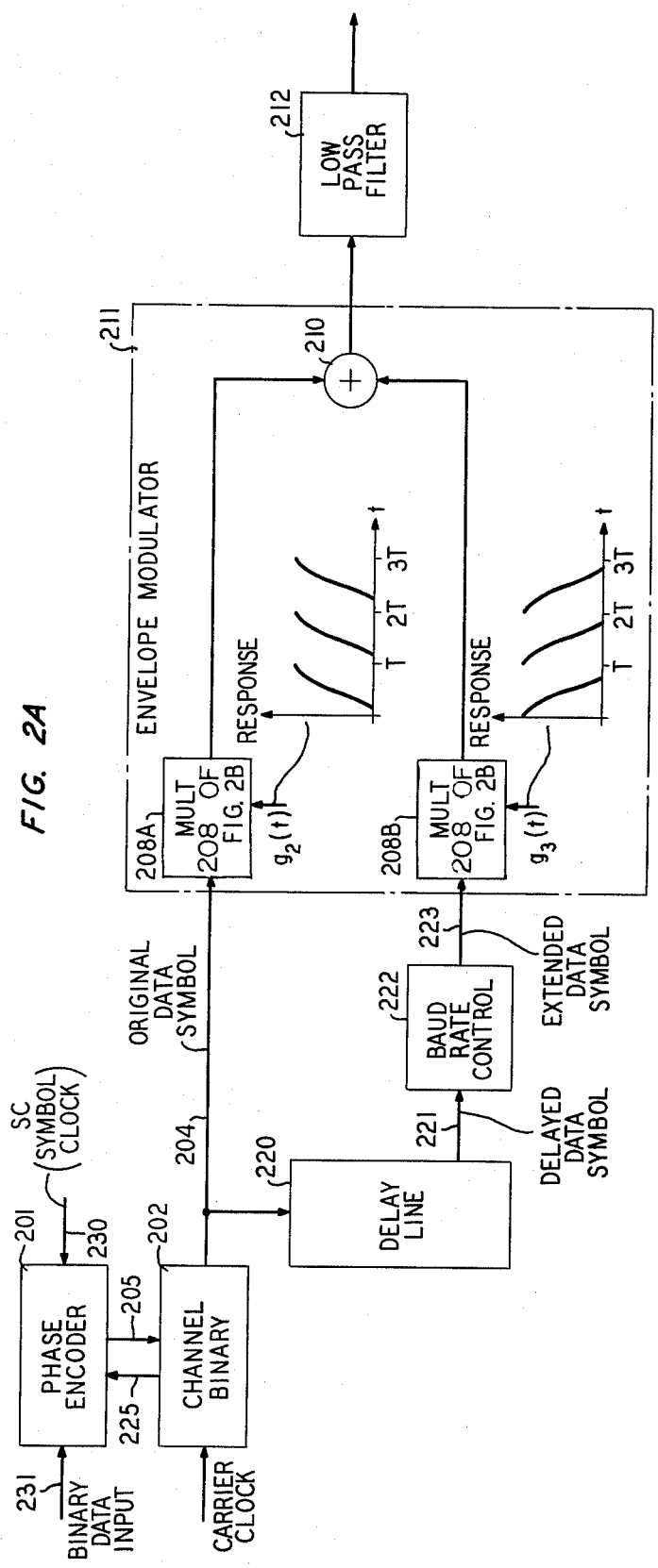
FIG. 2A is a block diagram of a combining arrangement in accordance with the invention.

In both prior art methods channel binaries 102 and 103 each deliver a symbol having a duration of 2T seconds in order that the symbol be gradually introduced to the output signal path over a period of 2T seconds. The same results are achieved in a more compact manner by the instant invenion as shown in FIG. 2A. Whereas in the prior art each channel binary delivered overall data symbols having a 2 symbol interval duration ($0 < t < 2T$); the instant invention achieves the same results by means of a two-step process: (1) channel binary 202 delivers original data symbols over the interval ($0 < t < T$), and (2) delay line 220 and baud rate control 222 synthesize extended symbols during the interval ($T < t < 2T$). It is therefore the function of the delay line and the baud rate control to generate the continuation in time of each original data symbol emanating from channel binary 202; this is accomplished through delay and phase shift of the original data symbol itself. This new signal existing on line 223 is called an extended data symbol. The original data symbol and its extensions are, therefore, contiguous portions of an overall data symbol that are interconnectable in time without discontinuities in phase or amplitude.

FIG. 2A discloses an illustrative embodiment of the instant invention. For the purpose of illustration a four-phase PSK signal will be considered; however, the invention is readily applicable to any multiphase PSK system and even extends to non-PSK systems. Dibits are formed in phase encoder 201 in substantially the same mnner as discussed in connection with FIG. 1A. Phase encoder 201 is responsive to dibits received on line 231 and to phase information from channel binary 202 on line 225 for determining a new phase to be delivered to channel binary 202 over line 205 at a time synchronized with the symbol clock signal available on line 230. The carrier wave that emerges from channel binary 202 on line 204 has its phase shifted by one of four possible amounts every T seconds and is deemed to be an original data symbol. The original data symbol enters multiplier 208A on line 204. This signal is gradually introduced to summing amplifier 210 by multiplicatin with the $g_2(t)$ weighting function. In this scheme instead of one multiplier weighting a symbol for two baud intervals, multiplier 208A weights it for the duration of one symbol interval by the response factor $g_2(t)$, as graphically shown in FIG. 2A. At the end of this time (T seconds) this same symbol has propagated through delay line 220, it is phase corrected by baud rate control 222 and weighting thereof is carried on in multiplier 208B for another symbol interval by the factor $g_3(t)$ as similarly shown graphically in FIG. 2A. By inspection, it is apparent that the composite effect of $g_2(t)$ and $g_3(t)$ in FIG. 2A is the same as $g(t)$ in the scheme of FIG. 1A.

Figure 2B:
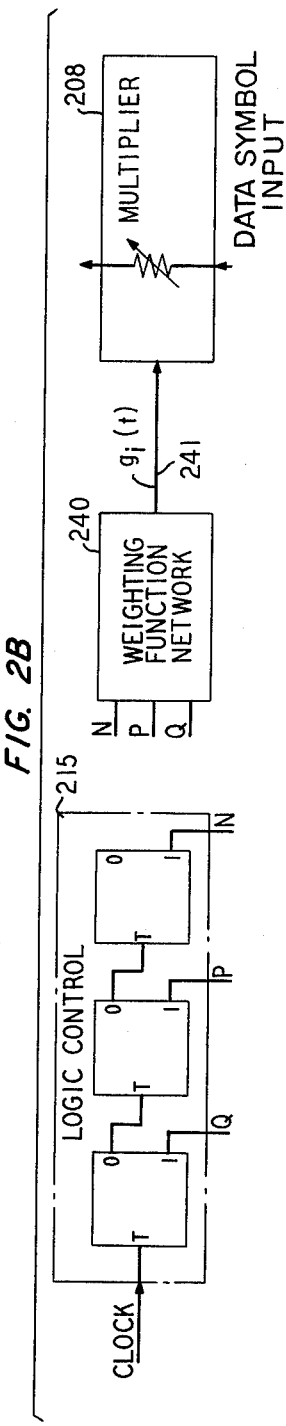
FIG. 2B is a circuit for obtaining a plurality of control states of a clock and applying same to a multiplier circuit.

Multipliers found in transversal equalizer circuits traditionally utilize a variable attenuator. An attenuator having a sequentially variable impedance as required by the instant invention is easily realized by defining a plurality of control states such as logic control 215 of FIG. 2B illustrated. Logic control 215 shows a three stage binary divider comprising toggle flip-flops and driven by a periodic (T/8 seconds per cycle) clock signal which is phase locked to the symbol clock delivered to phase encoder 201 on lead 230 of FIG. 2A. Logic control circuit 215 generates eight unique control states, defined by the output states of leads N, P and Q, in a T second interval. Weighting function network 240 provides a voltage output on lead 241 whose amplitude is defined by the input control state on leads N, P and Q and thus comprises what is commonly known as a digital to analog converter. Weighting function network 240 delivers a sequence of voltage states ($g_i(t)$), such as illustrated by FIG. 5, corresponding to a segment of the weighting function. Multiplier 208 operates as a resistive element such as a field effect transistor whose conductance varies as the input voltage on lead 241.

A delay line implemented as a shift register provides a suitable delay for digital data symbols. An example is offered wherein an 1800 Hz square wave carrier is phase modulated at a 1200 baud rate. Original data symbols on line 204 enter delay line 220 which provides a delay of a one baud interval. The data symbols having been properly delayed must now be phase shifted to "look like" the continuation in time of the data symbol over the interval ($T < t < 2T$). For the example given of an 1800 Hz carrier and a baud interval of 1/1200 seconds, a 180° phase correction will suffice to convert the delayed data symbols on line 221 into extended data symbols on line 223. Baud rate control 222 is simply an inverter.

FIG. 3 shows an embodiment of the invention wherein the 1800 Hz carrier frequency is phase modulated at either 1200 or 1600 baud. Baud rate control lead BR is set to a logical 0 when the desired transmission rate is 1200 baud to thereby force the outputs of NAND gates 324 and 325 into logical 1 states, thereby precluding signals on lead 321b. Delay line 320 thus becomes a 24 bit shift register clocked at 28.8 kHz and provides a delay of one baud interval (1/1200 seconds). The net effect of NAND gates 326, 327 and 328 is an inversion of the delayed symbol that provides the 180° phase correction required to convert the delayed data symbol on line 321a into an extended data symbol on line 323. When the desired symbol rate is 1600 baud however, the delay line and baud rate control circuit still interact to provide a delay of one baud interval (now 1/1600 seconds) of the same 1800 Hz carrier. Such a delay however, requires a 45° phase correction of the carrier wave to convert the delayed symbol into an extended symbol. This is accomplished by introducing an additional tap to the delay line such as intermediate tap 321b on delay line 320. The data symbol present on this tap is delayed by one cycle of the 1800 Hz carrier. An extended data symbol is then synthesized by: (1) Gating onto line 323 the data symbol present on intermediate tap 321b for the duration of an interval ($0 < t < T/2$) and (2) gating onto line 323 and inverting the data symbol present on tap 321a (symbol delayed by 1-1/2 cycles of the 1800 Hz carrier) during the interval ($T/2 < t < T$). This algorithm operates successfully when the frequency of the square wave carrier and the baud rate are interrelated as in the example. Similar algorithms may be derived for other baud rates.

Original data symbols present on line 304 and extended data symbol present on line 323 enter envelope modulator 316 for combination in a manner similar to either of the methods disclosed in FIGS. 1A and 1B.

While the envelope modulation technique as set forth in the Baker patent may provide a better functional understanding of the operation of an envelope modulator, the combinatorial logic scheme set forth in the Roycraft patent is streamlined to handle multiplication by a sequence of predetermined quantities such as a segmented weighting function. Roycraft teaches a method for digitally multiplying each of two signals by a predetermined weighting function and adding their products. Since the weighting function in the example embodiment is segmented into intervals of T seconds duration a suitable multiplier may be realized by modifying Table III on page 5 of the Roycraft patent as shown below.

| MODIFIED TABLE | | | | | | |
|---|---|---|---|---|---|---|
| CONTROL STATES | | | V W X Y Z OUTPUT STATES | | | |
| N | P | Q | CH.A=0 CH.B=0 | CH.A=0 CH.B=1 | CH.A=1 CH.B=0 | CH.A=1 CH.B=1 |
| 1 | 0 | 0 | 10000 | 01111 | 10000 | 01111 |
| 1 | 0 | 1 | 10001 | 01110 | 10001 | 01110 |
| 1 | 1 | 0 | 10010 | 01001 | 10110 | 01101 |
| 1 | 1 | 1 | 10011 | 00110 | 11001 | 01100 |
| 0 | 0 | 0 | 10011 | 11001 | 00110 | 01100 |
| 0 | 0 | 1 | 10010 | 10110 | 01001 | 01101 |
| 0 | 1 | 0 | 10001 | 10001 | 01110 | 01110 |
| 0 | 1 | 1 | 10000 | 10000 | 01111 | 01111 |

Inputs N, P, and Q to logic network 313 represent states of a binary clock synchronized to the symbol rate and subdivided into eight control states. Impressed on the channel A and B inputs to logic network 313 are binary states of the phase modulated carrier waves corresponding to the original data symbol and the extended data symbol respectively. This Table completely represents one possible algorithm for the operation of logic network 313 and can be used as a truth table to obtain equations for V, W, X, Y and Z. Logic network 313 of FIG. 3 is, therefore, functionally equivalent to logic network 113 of FIG. 1B.

Distortion can be further reduced by introducing data symbols even more gradually. This is achieved by adding precursors and tails to the weighting function and extending each data symbol over a longer interval. FIG. 4 provides a general realization of the instant invention and takes the form of a modified transveral filter. In its digital implementation the weighting functions are discrete multiplier coefficients, each changing its value according to a predetermined sequence as data symbols propagate along the delay line. Each coefficient is a discrete value corresponding to a particular amplitude of a weighting function such as the one shown in FIG. 5. The overall weighting function now includes a precursor described by the $g_1(t)$ coefficients and a tail described by the $g_4(t)$ coefficients. Signals emerging from each baud rate control circuit are data symbols extended in time by integer multiples of the symbol interval. Four multiplications are in progress simultaneously. While $g_1(t)$ is multiplying the $n^{th}$ data symbol, $g_2(t)$ is multiplying the $n-1^{st}$ data symbol extended by one baud interval, $g_3(t)$ is multiplying the $n-2^{nd}$ data symbol extended by two baud intervals, and finally $g_4(t)$ is multiplying the $n-3^{rd}$ data symbol extended by three baud intervals. The baud rate control circuits provide the necessary phase correction to the delayed data symbols to generate extended data symbols. Combinatorial logic circuits perform this function through selective gating of the data symbol or its inverse, delayed by one or more time intervals, in substantially the same manner as discussed in connection with FIG. 3.

FIG. 5 illustrates a weighting function having a precursor and a tail suitable for implementation in FIG. 4. The weighting function is subdivided into four equal segments, each having a duration T. While equal segments of duration T are not a requirement they are a convenience. Each segment is quantized into a plurality of levels that are referred to a multiplier coefficients. This quantization is required when digital means are used to approximate a linear multiplication process performed by an envelope modulator such as taught in the Roycraft patent.

While a specific embodiment of the invention has been described above, it will be apparent to one skilled in the art that numerous modifications within the scope and spirit of the following claims are possible.

What is claimed is:

1. In an arrangement for combining original data symbols, a circuit for shaping the amplitude of symbols in accordance with a predetermined weighting function, each data symbol being a signal modulated into one of a plurality of discrete states for a time interval, comprising:
   means responsive to the original data symbols for generating extended data symbols;
   means for generating segments of the predetermined weighting function;
   means for regulating the amplitude of said original data symbols in accordance with one of the generated segments of the predetermined weighting function; and
   means for regulating the amplitude of said extended data symbols in accordance with another segment of the predetermined weighting function.

2. In an arrangement for combining data symbols in accordance with claim 1 wherein the modulated signals comprise discrete phase shifts of a carrier wave having a substantially constant frequency between phase shifts.

3. In an arrangement for combining data symbols in accordance with claim 2 wherein said extended data symbols are formed by means for delaying the modulated signals and means for phase shifting the carrier of said delayed signals.

4. In an arrangement for combining data symbols in accordance with claim 3 said phase shifting means includes means for inverting the polarity of certain delayed signals and means jointly responsive to the delayed signals and said certain inverted delayed signals for sequentially gating same onto a common path.

5. In an arrangement for combining data symbols in accordance with claim 3 wherein said carrier wave comprises a binary signal and said delaying means comprises a shift register.

6. A transversal filter, adapted to accept original data symbols comprising signals modulated into one of a plurality of discrete states for a time interval, including a delay line having taps for providing variously delayed signals
   characterized by:
   means for generating a sequence of tap coefficients that define segments of a predetermined weighting function;
   a multiplier jointly responsive to the original data symbol and coefficients of one segment weighting function for forming products therebetween;
   control means connected to the taps for generating an extended data symbol; and
   a multiplier jointly responsive to the extended data symbol and coefficients of another segment of the weighting function for forming products therebetween.

7. A transversal filter according to claim 6 wherein the control means includes means responsive to states of a timing signal for sequentially gating predetermined segments of the variously delayed signals onto a common path to thereby form signal continuations.

8. In a method for shaping original data symbols comprising signals modulated into one of a plurality of discrete states for a time interval
   the steps of:
   generating a sequence of coefficients for each of a plurality of segments that define a predetermined weighting function;
   generating extended data symbols comprising continuations in time of said original data symbols;
   multiplying each original data symbol by coefficients of one of the segments to form a product therebetween; and
   multiplying each extended data symbol by coefficients of another of the segments to form a product therebetween.

9. In a method, in accordance with claim 8, wherein the step of generating extended data symbols includes the step of delaying the original data symbols.

10. In a method, in accordance with claim 9, wherein the step of generating extended data symbols further includes the step of shifting the phase of the delayed symbols.

* * * * *